United States Patent [19]
Trott et al.

[11] 3,864,664
[45] Feb. 4, 1975

[54] LINE HYDROPHONE ARRAY ELEMENT CALIBRATOR

[75] Inventors: W. James Trott, Annandale; Joseph F. Zalesak, Springfield, both of Va.

[73] Assignee: The United States of America as represented by the Secretary of the Navy, Washington, D.C.

[22] Filed: June 25, 1973

[21] Appl. No.: 373,323

[52] U.S. Cl. .............................. 340/5 C, 73/1 DV
[51] Int. Cl. ........................................ H04b 11/00
[58] Field of Search .................. 340/5 C, 5 R, 8 R; 181/0.5 A, 0.5 R, 0.5 AP; 73/1 DV

[56] References Cited
UNITED STATES PATENTS
3,009,104  11/1961  Brown ........................ 181/0.5 AP
3,659,255  4/1972  Trott ............................... 340/5 C Primary Examiner—Richard A. Farley
Attorney, Agent, or Firm—R. S. Sciascia; Arthur L. Branning; Norman V. Brown

[57] ABSTRACT

A line hydrophone calibrator having three coaxial units forming an elongated tubular body open at each end. A central calibrator unit has three aligned piezoceramic tubes, two outer tubes producing sound and a center tube sensing the produced sound. the two outer units, fixed to the central unit, are metal sound pressure retaining tubes with sonic resistors disposed along them to dampen standing waves. The inner wall of the elongated body has a rubber tubular lining, the space between the two being filled with de-aerated liquid which may be alternately pressurized to clamp a hydrophone element centrally in the center sound sensing tube and depressurized to allow the array to be moved to test the next element.

14 Claims, 4 Drawing Figures

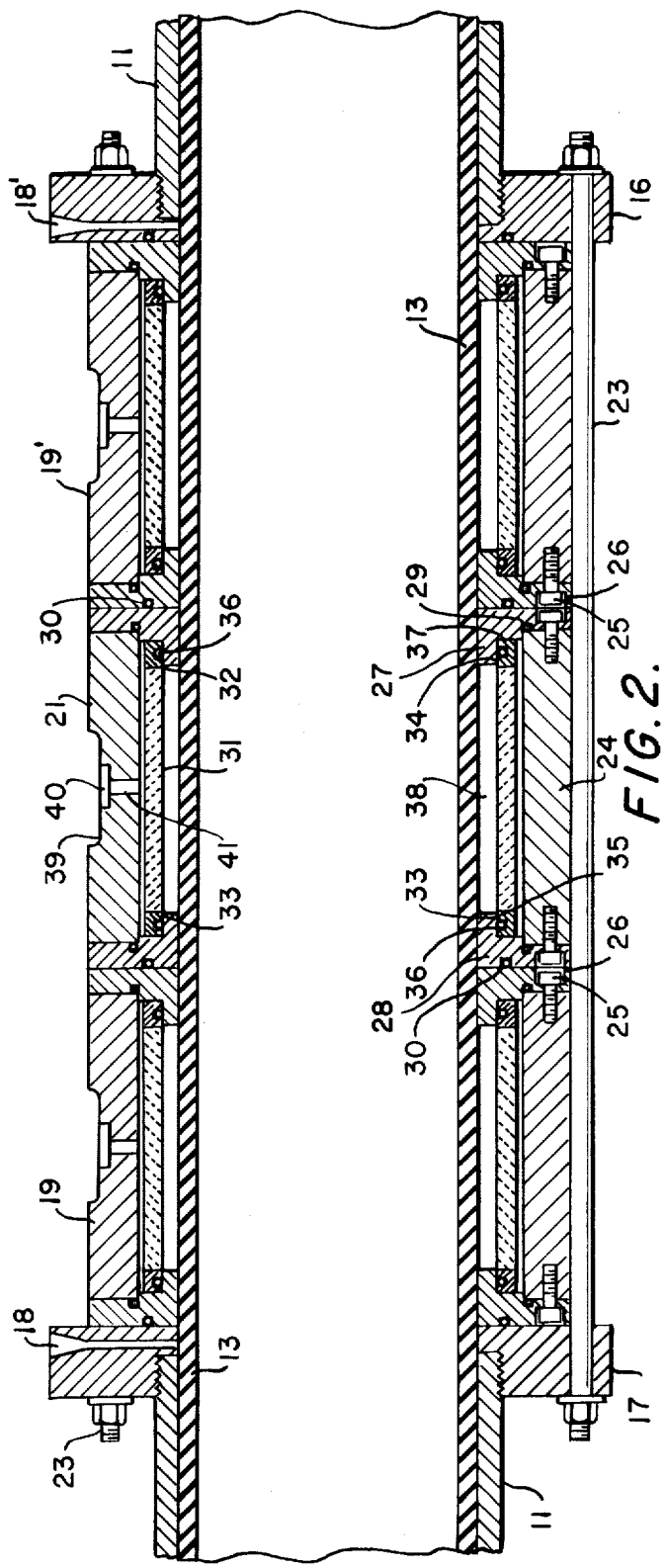
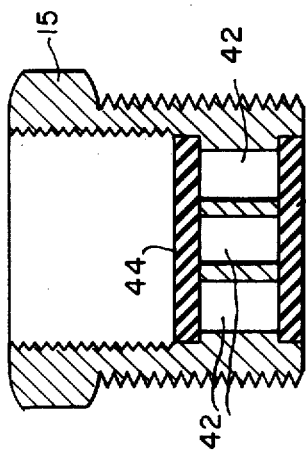
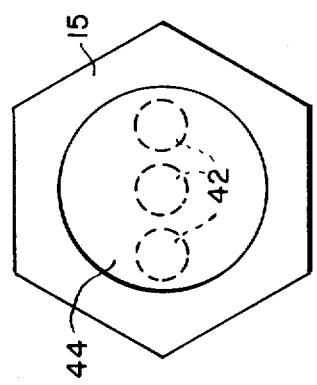

LINE HYDROPHONE ARRAY ELEMENT CALIBRATOR

BACKGROUND OF THE INVENTION

The invention relates to a novel hydrophone calibrator especially adapted for use with towed line hydrophone arrays.

Current interest in sea exploration has brought about a marked increase in sophisticated underwater sound monitors. Many of the developments have dealt with hydrophones. With the development of more accurate and sophisticated monitors there also developed a need for an accurate check of the monitors while in use. A particular problem is posed by line hydrophone arrays now in use which are typically an oil filled rubber tube of thirty to one thousand feet in length containing from ten to one hundred hydrophone elements disposed along the length of the tube. Deterioration of these monitors happens in a number of ways as they are frequently handled and under heavy use and may suffer damage from moisture penetration, shipboard handling, launching, or retrieving.

Tests of the arrays must be made frequently and accurately and particularly in the frequency range where degradation is likely to appear. The calibrator should therefore be capable of measuring the elements in the array at low frequencies to detect any increase in the low frequency roll-off due to decreased leakage resistance and it should cover a range of frequencies to detect any loss in sensitivity due to damage or the presence of air bubbles in the sensors.

This necessitates having a calibrator which can be used on location, as on ship, and which will not isolate one hydrophone element from the next, as the tube is filled with oil which on isolation will flow from the pressure area and give false signal indications. These arrays must be tested in their tube assemblies for the optimum testing conditions and for simplicity of operation.

Techniques in use today and the calibrators themselves are unable to simply and accurately solve the problem.

The existing technique in use today is free-field calibration in deep water which is difficult, expensive, and not sufficiently accurate. Use of the free-field technique requires a source to be accurately spaced from the towed array and both lowered to a depth in excess of twenty feet and a device to move the source accurately along the array to calibrate each element. A fixed source, as a dropped explosive charge, could also be used but it would require a depth of greater than several wavelengths of the test frequency, because of the greater test distance between the source and the line array. This greater depth is necessary to insure the surface reflected signal will be delayed sufficiently so as not to interfere with the direct signal.

Several coupler type calibrators could be considered such as an air-filled coupler, inertial or shaker type, impulse or stepped pressure type, and a water-filled coupler. As the array consists of many elements spaced varying distances apart, in an oil-filled tube, none of these couplers will completely surround an element in the conventional closed coupler calibrator mode. Consequently, the oil in the array would move away from the sound pressure source during calibration, as the neighboring portions of the array will be exposed to a lower pressure, and this will produce a significant signal drop across the stiffness of the array tube and consequently an inaccurate test reading.

A particular device is shown in U.S. Pat. No. 3,659,255. This device is also of the coupler type. This device, while solving certain of the prior art limitations, does not overcome the particular problems presented by a line hydrophone array. The device is closed at one end so it can not completely surround an element of an array as required for an accurate closed coupler operation.

SUMMARY OF THE INVENTION

The above and other disadvantages of prior art calibration devices and techniques are overcome in accordance with the present invention by providing an open-ended tubular calibrator which allows each element of a line array to be tested individually while not being isolated from other elements in the array. The calibrator, consists of three coaxial tubular units with an inner rubber lining. The calibrator is submerged in water and a line hydrophone array is pulled through it. Each hydrophone element of the array to be checked is positioned centrally in the center unit for its test. The center unit comprising three coaxially aligned piezoceramic tubes produces sound pressure in the outer two tubes which is received by the center tube and the hydrophone being tested. The output of the hydrophone under test is compared to the output of the center tube (the sensitivity of which has previously been determined) to determine the sensitivity of each hydrophone tested. The two outer units of the calibrator are metal tubes which retain the sound pressure developed by the center unit, decrease the standing waves by dissipating energy in sonic resistors inserted in the tops of the tubes, and act as entrance and exits for the line arrays. The inner rubber lining leaves a space between the lining and the calibrator which is filled with de-aerated liquid. This space may be pressurized and depressurized to centrally fix each hydrophone during its test.

It is thus an object of the invention to provide a simple and accurate calibrator for field calibration of line hydrophone arrays.

A second object is to produce a test range over a wide range of frequencies from 10 hertz to 10 kilohertz without interference from standing waves in the device.

A third object is to provide a smooth bubble-free passage of a line hydrophone array through a calibrator.

Another object is to provide central positioning of an array element under test in a calibrator.

Other objects, advantages and novel features of the invention will become apparent from the following detailed description of the invention when considered in conjunction with the accompanying drawings.

BRIEF DESCRIPTION OF THE DRAWINGS

FIG. 2 is an exploded sectional view of the center crystal calibrator section of the device;

FIG. 3 is a top view of a sonic resistor; and

FIG. 4 is a sectional side view of the sonic resistor taken along line 1—1 of FIG. 3.

DESCRIPTION OF THE PREFERRED EMBODIMENT

Figure 1:
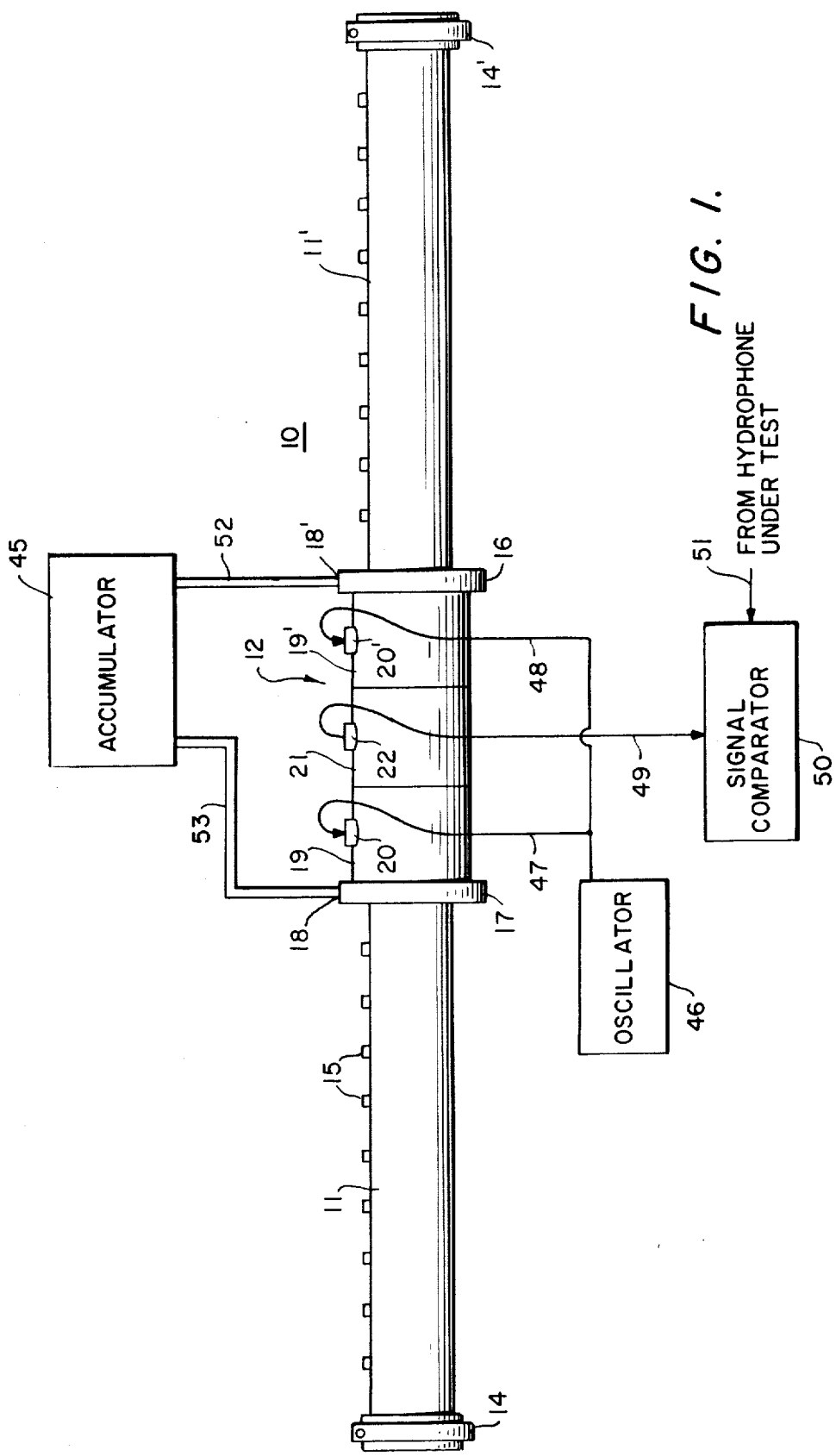
FIG. 1 illustrates a side view of the calibrator with a schematic of the operational connections of the device.

Referring to FIG. 1, a calibrator assembly 10 consists of two outer metal tubes 11, 11' and a center crystal unit 12. An inner rubber tube 13 (see FIG. 2) is sealingly clamped around the outer ends of metal tubes 11, 11' by band clamps 14, 14'. A plurality of identical sonic resistors 15 (only one of which is numbered) are inserted in the tops of metal tubes 11, 11' (see FIGS. 3, 4). An upper flange 16 and a lower flange 17 of the center unit 12 contain fluid circulating and fill holes 18, 18' (see FIG. 2). The center crystal unit 12 is made up of three coaxial tubes 19, 19', and 21. Outer tubes 19, 19' are provided with a coaxial cable connector 20 and middle tube 21 is provided with a coaxial cable connector 22.

Referring now to FIG. 2, the two outer metal tubes 11, 11' are screwed into upper and lower center flanges 16 and 17, and sealed with epoxy. The center unit 12 is then clamped between the upper and lower flanges 16 and 17, by hex head bolts 23.

The center unit 12 consists of three identical tubes. For description purposes, only the middle tube 21 will be described in detail. Tube 21 consists of an outer metal cylinder 24 which is fixedly clamped by a plurality of hex cap screws 25, equally spaced circumferentially around the cylinder, set in countersunk wells 26, similarly spaced, in upper and lower center flanges 27 and 28. These are sealed by O-rings 29. The tubes are sealed one from another and from upper and lower flanges 16 and 17, by O-rings 30 set in the lower center flanges 28 (O-ring is set in upper flange 16). A piezoceramic cylinder 31 has upper and lower metal end rings 32 and 33, fixed to it. The end rings and piezoceramic cylinder are isolated radially from upper and lower center flange rims 34 and 35, by O-rings 36 set in the end rings; and isolated axially by spacers 37. A space 38 is filled with polyurethane to the inside diameter of the flanges by rotating the unit about its axis and utilizing centrifugal force to fill the space.

The mounting for the coaxial connectors is formed by machining a flat surface 39, drilling a countersink 40, and drilling a hole 41 through metal cylinder 24. The coaxial connectors on outer tubes 19, 19' are formed in the same manner.

As best shown in FIGS. 3 and 4, the sonic resistors 15 may be made of a standard stainless steel pipe plug. Three holes 42 are bored in the bottom of the plug. A rubber diaphragm 43 is used to seal the bottom of the plug, then the holes 42 are filled with a highly viscose silicone fluid, and the top is sealed by another rubber diaphragm 44. These resistors are then inserted in holes drilled and tapped in the top of the tubes 11, 11' to reduce the standing wave ratio.

The operation of the calibrator can best be seen in FIG. 1. An accumulator/circulator 45 is connected to fill holes 18 in the upper and lower flanges 16 and 17, by an input line 52 and a discharge line 53. A sound input signal from a variable oscillator 46 is transmitted to the outer tubes 19, 19' via coaxial input cables 47 and 48. The output signal produced by the piezoceramic cylinder 31 as caused by the sound received in middle tube 21 is transmitted through a coaxial output cable 49 to a signal comparator 50. The output signal produced by the sound received by the hydrophone under test is transmitted to an input connection 51 of the signal comparator 50. These two output signals are compared in signal comparator 50 to determine the sensitivity of each hydrophone tested.

A sensitivity measurement of calibrator 10 is made prior to the first test of a line array on location and repeated as often as desired. This measurement is made by inserting a standard hydrophone element in the calibrator 10 and measuring the calibrator sensitivity with reference to the standard hydrophone over the test range of frequencies with signal comparator 50. This sets the sensitivity of the calibrator 10 which allows the unknown sensitivities of the line array hydrophones to be measured with signal comparator 50 using the premeasured sensitivity of calibrator 10 as the standard. The oscillator 46 and signal comparator 50 do not form part of the present invention.

Further details of a particular circuit for radiation and measuring of a calibration signal is disclosed in previously referred to U.S. Pat. No. 3,659,255.

Inner rubber tube 13 will have some sag and there will be a space and some air bubbles between tube 13 and the calibrator tube. The accumulator/circulator 45 circulates de-aerated fluid through the space via lines 52 and 53 and fill holes 18, 18' to fill the space and completely remove any air bubbles. Once the bubbles are removed the calibrator may be sealed off or the accumulator/circulator 45 can be left attached so that by increasing the pressure in the space which expands rubber tube 13, each element of a hydrophone array may be centrally clamped in the calibrator for its individual test. The pressure is released when the tests of the element are completed and it is desired to move the array to test the next element.

In operation, the total calibrator 10 is submerged in a trough of water and a line array is pulled through the calibrator. The length of the metal tubes 11, 11' provide the required mechanical mass reactance to retain the sound pressure at the array elements and to keep the oil in the array from flowing away from the particular element under test.

The calibrator shows a response peak at approximately 270 Hz and 810 Hz and a sharp dip at 650 Hz which are due to the standing waves along the tube. To reduce these wide excursions in signal level versus frequency and lower the standing wave ratio the sonic resistors 15 are utilized.

The sonic resistors 15 are acoustical devices designed in such a way that they can sample and dissipate some of the energy in a guided acoustical wave. They thus add losses to an acoustical transmission line and thereby reduce the standing wave ratio. The resistors are inserted through the walls of a waveguide (metal tubes 11, 11') so any sound pressure can act on the silicone fluid in the resistor. The fluid moves under influence of the sound pressure, but since the silicone is highly viscous, it turns the acoustical energy into heat thus providing an acoustical resistance. The resistors are inserted small fractions of a wavelength apart so that the resistance appears essentially continuous along the length of the waveguide.

In order for the resistors to be effective the acoustic resistance must dominate the mass reactance at the frequencies of interest, which places limitations on the length and diameter of the oil filled holes (42) and on the viscosity of the oil to be used. The desired acoustic resistance in order to achieve a usable standing wave ratio is in the order of $10^9$ MKS acoustic ohms per meter.

Calculations of a device using PZT-4 piezoceramic elements (ceramic 5 inches OD, 4½ inches ID by 3½ inches long) for sound pressure production and reception indicate a sensitivity of −83 dB re 1 volt/microbar for the center tube (21) and production of 95 dB re 1 microbar for 100 volts driving the outer two units (19, 19'). With the outer metal tubes (11,11') of 1 meter in length the calibrator is operable from 20 Hz to 10 kHz. Increasing the length of these tubes should allow operation down to 10 Hz. The resistors placed 10cm apart along the top of each tube (11,11') with holes (42) of 3 cm in length and 15 mm bore filled with silicone oil having a viscosity of 100,000 centipose yields the desired $10^9$ MKS acoustic ohms per meter and decreases the standing wave from a maximum to minimum of 60 dB down to 10 dB.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A hydrophone testing system comprising:
   a tubular unit open at both ends containing means for producing and receiving sound pressure and for receiving a hydrophone to be tested, said means having a sound receiving tube and sound producing tubes located coaxial with and adjacent to each end of said sound receiving tube, said tubular unit being adapted to be submerged in water.
2. The system of claim 1 further comprising:
   elastic liner means within said tubular unit and sealed at the outer ends thereof with the space between said linear and said unit being filled with de-aerated liquid.
3. The system of claim 2 further comprising:
   de-aerated liquid accumulator means communicating with said space to expand and contract said elastic liner means to centrally clamp and release said hydrophone.
4. The system of claim 1 further comprising:
   two elongated tubular sound retaining units each coaxially connected to an opposite end of said tubular unit.
5. The system of claim 4 further comprising:
   elastic liner means within said tubular unit and said sound retaining units and sealed at the outer ends of said sound retaining units with the space between the units and the liner being filled with de-aerated liquid.
6. The system of claim 5 further comprising:
   de-aerated liquid accumulator means communicating with said space to expand and contract said elastic liner means to centrally clamp and release said hydrophone.
7. The system of claim 6 further comprising:
   sonic resistors disposed along the length of said tubular sound retaining units to dampen standing waves.
8. The system of claim 1 wherein said means for producing and receiving sound pressure is constructed of piezoceramic material.
9. The system of claim 8 further comprising:
   elastic liner means within said tubular unit and sealed at the outer ends thereof with the space between said linear and said unit being filled with de-aerated liquid.
10. The system of claim 9 further comprising:
    de-aerated liquid accumulator means communicating with said space to expand and contract said elastic liner means to centrally clamp and release said hydrophone.
11. The system of claim 8 further comprising:
    two elongated tubular sound retaining units each coaxially connected to an opposite end of said tubular unit.
12. The system of claim 11 further comprising:
    elastic liner means within said tubular unit and said sound retaining units and sealed at the outer ends of said sound retaining units with the space between the units and the liner being filled with de-aerated liquid.
13. The system of claim 12 further comprising:
    de-aerated liquid accumulator a means communicating with said space to expand and contract said elastic liner means to centrally clamp and release said hydrophone.
14. The system of claim 13 further comprising:
    sonic resistors disposed along the length of said tubular sound retaining units to dampen standing waves.

* * * * *